Aug. 8, 1933.  W. W. DE LANEY  1,921,456
SHEET RUBBER PRODUCT
Original Filed Jan. 16, 1931  3 Sheets-Sheet 1
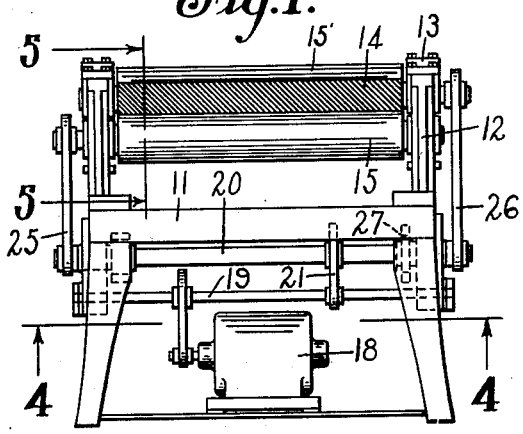
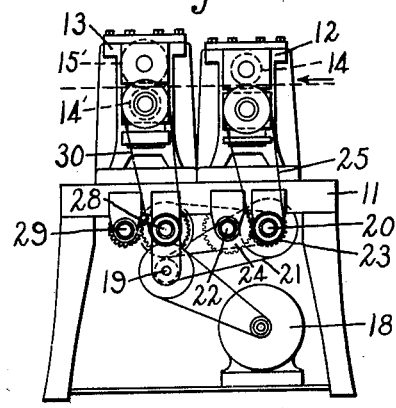
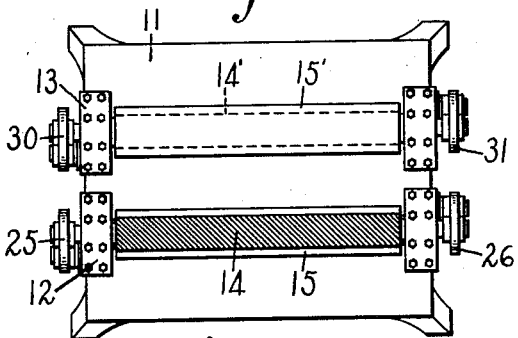
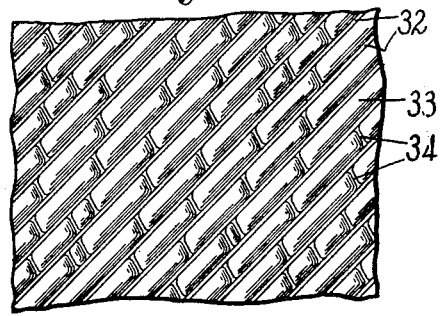
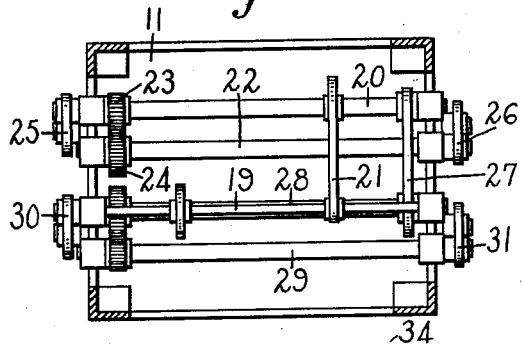
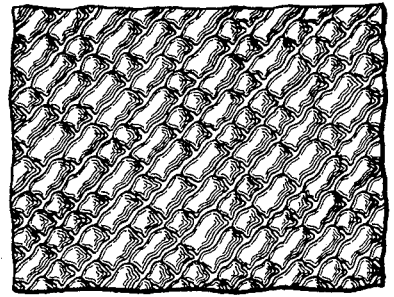
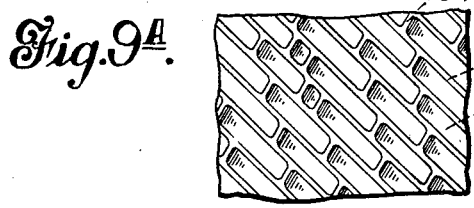

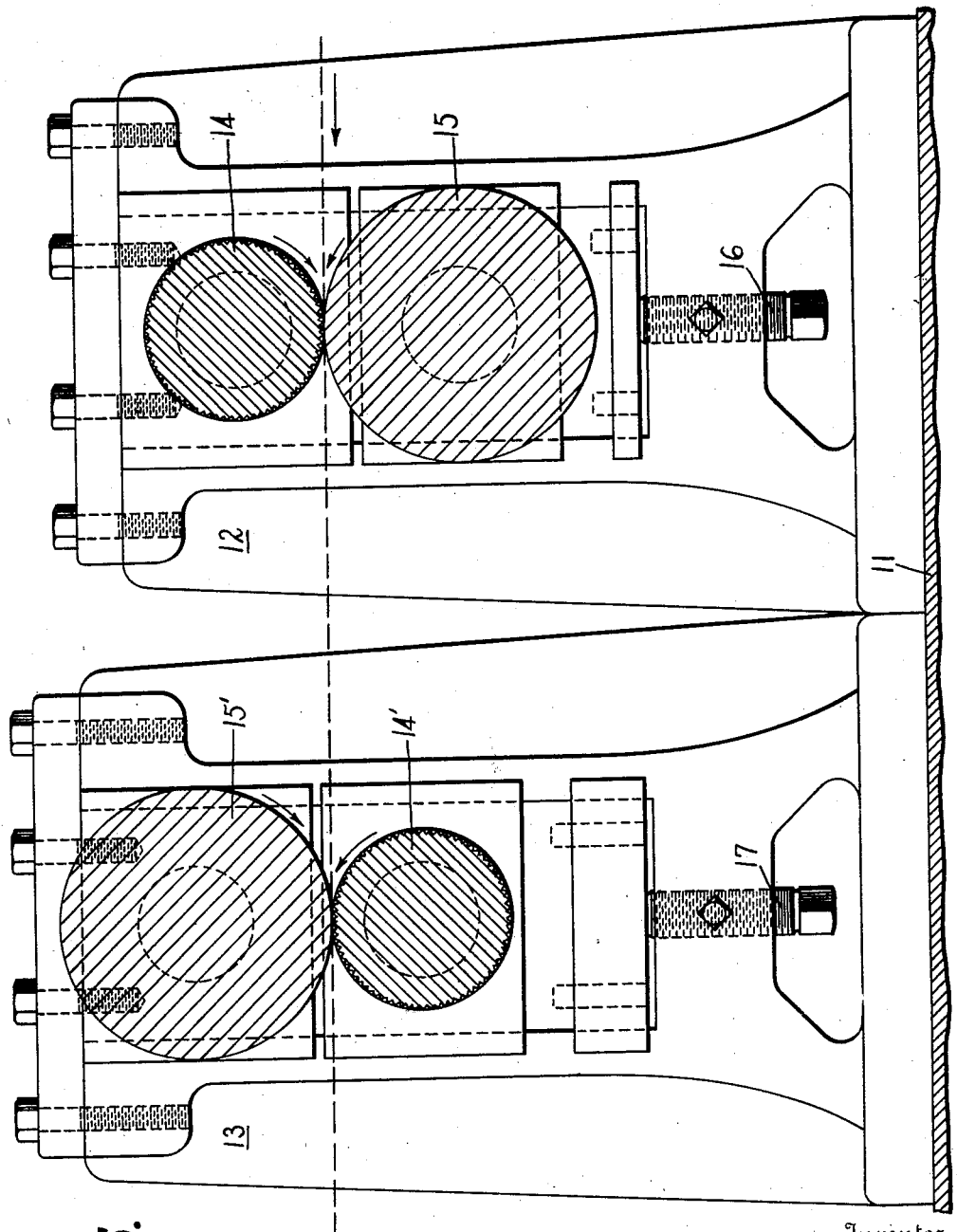

Aug. 8, 1933.  W. W. DE LANEY  1,921,456
SHEET RUBBER PRODUCT
Original Filed Jan. 16, 1931   3 Sheets-Sheet 3

Inventor
Wallace W. DeLaney
By Rockwear & Bartholow
Attorneys

Patented Aug. 8, 1933

1,921,456

UNITED STATES PATENT OFFICE 1,921,456

SHEET RUBBER PRODUCT

Wallace W. De Laney, New Haven, Conn., assignor to The Seamless Rubber Company Incorporated, New Haven, Conn.

Original application January 16, 1931, Serial No. 509,110. Divided and this application January 19, 1932, Serial No. 587,526, and in Germany March 11, 1931

5 Claims. (Cl. 41—24)

This invention relates to a new sheet rubber product, the present application being a division of my application, Serial No. 509,110, filed January 16, 1931.

The invention relates especially to sheet rubber such as used in the manufacture of bathing caps and similar articles, in which the material before vulcanization is subjected to an operation by which the rubber is displaced to create a multiplicity of small bosses or protuberances on the sheet.

One of the objects of the present invention is to produce thoroughly crinkled sheet rubber having an attractive appearance and other properties desirable for the production of bathing caps.

Another object is to furnish a crinkled rubber sheet embossed in such a manner that in appearance it resembles an attractive textile fabric.

To these and other ends the invention consists in the novel features to be hereinafter described and claimed.

In the accompanying drawings:

Fig. 1 is a front elevation of an apparatus or machine for treating sheet rubber in accordance with my invention;

Fig. 2 is a side elevation thereof;

Fig. 3 is a top plan view of the machine;

Fig. 4 is a section on line 4—4 of Fig. 1;

Fig. 5 is an enlarged longitudinal section, on line 5—5 of Fig. 1, through the upper part of the machine.

Fig. 9 is a fragmentary face view of the material after it has passed through the first pair of rolls, the protuberances being larger than their actual size, and this view showing that face of the material which is contacted by the ribbed roll of said pair;

Fig. 9A is a fragmentary view of the material shown in Fig. 9, but exhibiting the opposite or under face thereof;

Fig. 10 is a view similar to Fig. 9 showing the same face of the material after it has passed through the second set of rolls.

Figure 6:
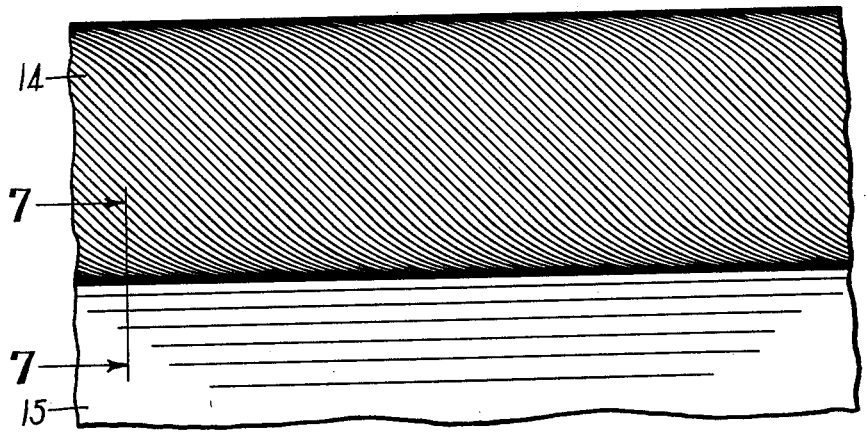
Fig. 6 is a view somewhat smaller than actual size showing portions of the rolls.

By my novel method, I form bumps and alternating valleys or depressions on a sheet of unvulcanized rubber by confining the surface of the sheet along spaced lines and displacing the rubber between such lines in a direction generally transverse to the direction of such lines. I have found that the valleys or depressions formed by my method of procedure can be caused in general to line up with each other so as to produce a plurality of substantially or approximately parallel valleys that extend substantially throughout one dimension of the sheet. And I have discovered that by subjecting the sheet to a further operation of the same general nature but different in detail, the bumps and valleys first produced can be subdivided so that in the aggregate a great many bumps and depressions are produced which cause the sheet to be crinkled very completely and to be given a very attractive appearance. I have also discovered that by feeding the sheet between rotary surfaces, one of which presents circumferentially a number of interruptions so as to provide an intermittent grip upon the sheet while the other surface is moving at a substantially higher rate of speed, it is possible to produce in one pass of the material through the rolls a deep crinkle characterized by a number of valleys and ridges running approximately parallel to each other and parallel to the length of the sheet being treated. By providing one of the rolls with ribs so disposed that they have a transverse movement in a direction at an acute angle to the direction of feed of the sheet, and by causing the other roll to rotate at a substantially faster speed, it is possible to cause considerable thickening of the sheet by deep crinkling thereof and packing of the plastic material into the spaces between the ribs. Then by subjecting the material to a further operation of the same kind but in which the biased or oblique ribs act at angles to the action of the first-mentioned ribs, the protuberances can be subdivided and a number of additional longitudinal ridges produced so as to create in the sheet a somewhat irregular and unmechanical embossed surface effect which avoids a "machine made" appearance. The two sets of ribs above referred to might be expected to create a number of diagonally disposed lines which intersect to produce fairly prominent small squares or like figures by the pressing of the material along the ridges of the ribs, but as a matter of fact there is an almost total absence of checkerboard effect and the projections are quite irregular in contour and in general present the effect of an irregularly woven rough-surfaced twill or like fabric. This I ascribe to the fact that in the production of the material there are formed a number of longitudinal ridges or line effects which are pressed into the sheet and are at acute angles to the ridges of the roll ribs which impinge upon the sheet, and I also ascribe the new effect in part to a peculiar thickening or packing up of the material in the spaces between the diagonal ribs at the roll bite under the influence of the smooth mating roll which preferably rotates at a substantially higher speed than the ribbed roll.

In carrying out my invention, I prefer to employ a single machine having sets of rolls in tandem arrangement so that a long sheet can undergo two or more rolling operations in a continuous process. By preference the sheet, after passing between rolls in which the ribbed roll is at one face of the sheet, passes through another set in which the ribbed roll is at the opposite face, and after the long sheet passes through the one machine, which imparts all of the crinkling desired, it can be vulcanized so as to hold the crinkling permanently in the material.

In the machine shown in the drawings, two sets of rolls arranged in tandem are shown as located upon a table-like frame 11. The first roll stand is shown at 12 and the second at 13. It will be observed that the upper roll of the first set, which is indicated at 14, is a helically ribbed roll, whereas the lower mating roll 15 is a smooth roll; also that the lower roll 15 is of somewhat larger diameter than the roll 14. In the second set, the roll 14' is similar to roll 14, but in this case is lowermost, whereas roll 15', which is similar to roll 15, is uppermost. Preferably the two sets are so arranged that the bite of the second set is horizontally alined with that of the first set. The rolls are journaled in the usual or any preferred bearing blocks and any amount of pressure required can be exerted upon the sheet as it passes between the rolls of a given pair by suitable pressure devices, which in this case comprise the pressure screws 16 and 17 which act upon the bearing blocks of the lowermost rolls. It will be obvious that by adjustment of the screws, the pressure exerted upon the rubber sheet can be changed as required, and in practice there is a considerable amount of pressure exerted upon the sheet in creating crinkled effects such as I have especially in view.

In each roll set the large smooth roll is driven materially faster than the mating ribbed roll, and in the second set the rolls are driven more slowly than the corresponding rolls of the first set. This is due to the fact that the sheet is thickened up rather than thinned or reduced by the rolling operation which is effected. In the particular instance shown, it can be assumed that the surface speed of roll 14 is 49 feet per minute, that that of roll 15 is 112 feet per minute, that that of roll 14' is 45 feet per minute, and that the surface of roll 15' moves at the rate of 100 feet per minute. These are speeds which have been shown to be satisfactory in actual practice, but they are mentioned merely by way of illustration. The drive mechanism for producing these relative speeds of rotation can be of any preferred type, and the following description of the particular drive mechanism shown in the drawings is merely by way of example.

In the machine shown, the power for rotating the rolls is furnished by an electric motor 18 which drives a transverse shaft 19 in the lower part of the frame of the machine. From this shaft, a shaft 20 is driven by a belt 21. Parallel and adjacent to shaft 20 is a shaft 22, these shafts 20 and 22 being geared together by gears 23 and 24 having the proper number of teeth. Shaft 20 drives roll 15 by means of belt 25, as shown in Fig. 2, whereas shaft 22 drives roll 14 by means of belt 26, as shown in Fig. 1. From shaft 20 rotation is transmitted by belt 27 to a shaft 28 geared to a shaft 29, and the shaft 28 through belt 30 drives roll 14', whereas shaft 29 through belt 31 drives roll 15'.

While I do not desire to limit myself to any particular dimensions, I may mention certain dimensions as illustrative and in order to give a better understanding of the nature of the ornamentation which is effected in the preferred practice of my invention. In one machine which has been constructed, the rolls 14 and 14', which are the ribbed rolls, have a diameter of 4 inches, while the rolls 15 and 15', which are the plain-surfaced rolls, are 6 inches in diameter. The rolls 14 are provided with helical ribs 14a, which in this case are about ten to the inch, and arranged at an angle of approximately 45° to the direction of travel of the sheet through the machine. The rolls 14 and 14' are or may be identical, but owing to the fact that one is the upper roll and the other the lower roll of a set, the lines of pressure on the sheet of the ribs of one of the ribbed rolls will intersect approximately at right angles the lines of pressure of the ribs of the other ribbed roll. In the particular case illustrated, the ribs are formed by V-shaped helical cuts in the roll, the angle of the V being about 60°, and the ridges of the ribs thus formed present flat portions 14b about .015 inch wide, which flat portions are adapted to confine the sheet between them and the opposing surface of the large plain-surfaced roll when the material is in the bite of the rolls.

In the operation of the machine above described, a long sheet of unvulcanized rubber which is usually quite thin and which customarily has a width of, say, 30 inches, is fed into the first set of rolls 14 and 15, and from these rolls it passes between the rolls 15', 14', and thence out of the machine. After the sheet has been entered between the first set of rolls, it will be observed that it is drawn lengthwise by the rolls of said first set and that a number of longitudinal ridges or pleats are formed. As the material issues from the first set of rolls its upper surface has the appearance shown in Fig. 9, which figure, however, shows the material on a somewhat magnified scale. The ridges of the ribs of roll 14 cause the sheet to be marked with a plurality of narrow parallel lines, as shown in Fig. 9, these lines being at an acute angle (for example, 45°) to the direction of feed of the sheet. These parallel lines are indicated in Fig. 9 by reference character 32. Between the lines it will be found that the sheet has raised portions or protuberances 33 extending upwardly, and depressed portions or valleys 34 which extend downwardly. It will be observed, also, that the depressions or valleys between the different pairs of lines are disposed in lines generally parallel to the direction of travel of the sheet and that they form generally longitudinal creases in the upper surface of the material and that there are corresponding generally longitudinal ridges at the lower surface of the material. This lining up of the depressions between the protuberances and especially the lining up of such depressions or valleys lengthwise of the sheet is believed to be an entirely new result in the treatment of material of this character. The creases referred to are usually at less than 90° to the lines 32, as indicated in Fig. 9. Also, by the treatment described, the protuberances 33 and the depressions 34 are made of considerable depth so that the sheet is well crinkled.

Figure 7:
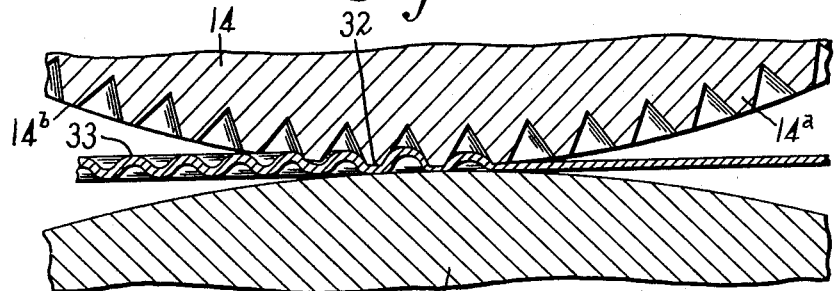
Fig. 7 is an enlarged section on line 7—7 of Fig. 6, showing the ribbed roll, this view being considerably larger than actual size.
Figure 8:
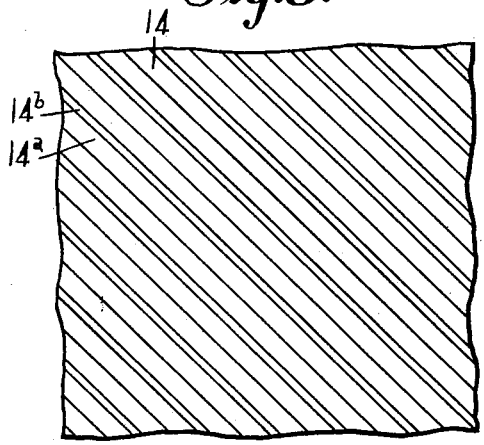
Fig. 8 is a fragmentary view on the same scale as Fig. 7 of a portion of the ribbed roll.
Figure 11:
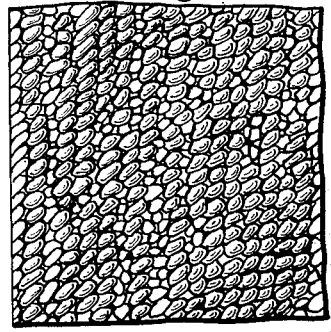
Fig. 11 is a fragmentary view of a portion of the material on a smaller scale than Fig. 10 taken from the same side of the sheet.

The formation of the lengthwise creases by the lining up of the individual depressions or valleys may be due to some extent to the screw-like action of the upper roll having the helical ribs thereon which tend to move the material in a direction transversely of the sheet. The lower roll having the plain surface has a considerably higher surface speed than the ribbed roll, and as the material is confined between the two rolls, as shown in Fig. 7, the tendency of the more rapidly rotating roll is believed to be to produce a displacement of the material by stretching it in a direction generally transverse to the ridges of the confining ribs by which it is pressed against the smooth roll and to pack the material to some extent in the spaces between the ribs. It will be observed from Fig. 7 that the ribs, which have a bodily movement somewhat transversely to the direction of feed of the sheet, present in effect a plurality of teeth between which the material is displaced out of the plane of the sheet. The ribs or teeth have a very effective feeding action on the sheet and by a sort of plowing action cause the material between the ridges of adjacent ribs to be displaced in a direction which is substantially transverse to the lines at the ridges of the ribs. Whatever may be the particular action that takes place between the rolls, the result of the operation of these rolls upon the material is the satisfactory crinkling of the sheet by the creation of relatively deep protuberances and depressions and a considerable reduction both in the width and length of the sheet.

When the material has been acted upon by the first set of rolls, there is a readily discernible difference between the two faces of the sheet. The protuberances on the upper face of the sheet are of larger size than the depressions (Fig. 9), whereas at the opposite or lower surface of the sheet the depressions are larger than the protuberances, as shown in Fig. 9A.

As the material issues from the first set of rolls, it moves less rapidly than the incoming material and passes to the second set of rolls which, as above explained, are driven more slowly than the corresponding rolls of the first set. In between the sets, however, the material maintains the longitudinal creases and intervening ridges. These ridges are further pressed into the sheet by the second set of rolls. In this second set of rolls the ribbed roll is lowermost and acts upon the opposite surface of the sheet from that acted upon by roll 14, and such lines of pressure on the sheet as are created by the ridges of the ribs or roll 14' cross the lines created by roll 14, usually at approximately right angles. The effect of the second set of rolls is to subdivide the protuberances and depressions and to alter their shapes, as will be seen by comparing Fig. 10 with Fig. 9. It will be noted that in Fig. 10 the protuberances are more irregularly shaped and smaller than those of Fig. 9, this being due to the action of the second set of rolls, and a further important effect produced by the action of the second set is to make visible on the sheet a considerable number of fairly short irregular raised lines of bumps running generally lengthwise of the sheet, these lines being diagonal to the figures formed by the crossing of the rib lines of the respective sets of rolls and being staggered and creating an irregular but artistic effect which is similar in a general way to that produced in a somewhat irregularly woven twill fabric.

Another effect produced by passing the material through the rolls of the second pair is that the two surfaces of the sheet are in this manner given a substantially identical, or, at any rate, a very similar appearance, so that in many cases it will be immaterial which surface appears at the outer part of the finished article, although in other cases one surface may be noticeably superior to the other from the standpoint of appearance. In the case of the particular material shown, it is to be understood that while the upper surface only is illustrated, the lower surface is substantially the same as the upper surface. While in Fig. 10 of the drawings (which illustrate the material under considerable magnification and before vulcanizing), there appear a number of irregularly shaped figures, some of them elongated, having curved contours, it should be understood that these figures do not define surfaces which lie wholly above the general plane of the sheet, because the fact is that the surfaces intended to be represented are crinkled and a considerable number have depressed as well as raised portions therein, and therefore have parts which project downwardly from the general plane of the sheet, and other parts which project upwardly therefrom. Thus, it will be understood that the appearance of the completely crinkled sheet at the under side will be substantially the same as shown in Fig. 10.

Long sheets of material can be very satisfactorily treated by my new method, and the complete operation of crinkling by passing the sheet between two sets of rolls can be very quickly performed. The second set of rolls act upon the material very promptly after the operation of the first set, and therefore assist in setting the crinkles formed in the first set before such crinkles can be lost to any appreciable degree. After the material has passed out of the second set of rolls it should be vulcanized so that the crinkles will be permanently held in the sheet structure. If the crinkled sheet is left unvulcanized for a substantial period of time, there is apt to be a flattening out of the material with a loss of some of the crinkling.

By having the second set of rolls act on the material while the latter is held at another point between the first set of rolls, the effect of the second set and of the operation as a whole is noticeably improved as compared to the performance of rolling operations by pairs of rolls through which the material does not pass continuously. In some cases additional sets of crinkling rolls can be provided so that the tandem will have more than two sets operating on the material. In other cases the operation of a single set or group of rolls will suffice to give the ornamentation desired.

By carrying out the process as above described, that is, by having a ribbed roll act on one face of the material and then a ribbed roll act upon the opposite face, an interesting result is obtained, which is that the two surfaces of the sheet thus treated can be made substantially identical. This is an additional advantage of the crinkled material which I prefer to use for the manufacture of bathing caps, aprons, doilies, etc., but it will be understood that by making changes in the details of the process the crinkling effect can be considerably varied. It will also be understood that I do not limit myself in all aspects of the invention to a process in which the crinkling ribs of the machine act first upon one face of the material and then upon the opposite face.

Various changes may be made in the ornamented material and in the details of the process and apparatus for making the same without departing from the scope of my invention. While I have herein described the manner in which I prefer to practice the invention, I do not wish to limit myself to all of the details shown and described. Many modifications may be made within the scope of the invention as defined in the claims.

What I claim is:

1. An elongated sheet of rubber having a multiplicity of parallel lines impressed on the sheet on the bias, the material of the sheet between the lines presenting a multiplicity of alternating protuberances and depressions, the depressions disposed in a plurality of series which run generally lengthwise of the sheet to form valleys therein.

2. Crinkled rubber sheeting having a multiplicity of alternating protuberances and depressions arranged in lines intersecting each other substantially at right angles, the protuberances and depressions having an irregular contour, and there being a plurality of irregularly disposed but generally parallel ridges on the surface of the sheet which run substantially diagonally to the figures created by the aforesaid intersections.

3. Crinkled rubber sheeting having a multiplicity of alternating protuberances and depressions arranged in lines intersecting each other substantially at right angles, the protuberances and depressions having an irregular contour, and there being a plurality of irregularly disposed but generally parallel ridges on the surface of the sheet which run substantially diagonally to the figures created by the aforesaid intersections, the surface at one face of the sheet being substantially the same as that at the opposite face.

4. Crinkled rubber sheeting having a multiplicity of small protuberances and depressions arranged in parallel lines intersecting each other, the protuberances and depressions having an irregular contour, and there being a plurality of irregularly disposed but generally parallel ridges on the surface of the sheet which run substantially diagonally to the figures created by the intersecting lines.

5. Highly elastic sheeting comprising a thin sheet of vulcanized rubber of substantially uniform constituency throughout its cross-section deeply crinkled to present in the material of the sheet a multiplicity of small protuberances and depressions, said sheet having a series of parallel lines impressed therein and a further series of parallel lines impressed therein at an angle to the first series, the protuberances and depressions being within the areas or figures bounded by the intersecting lines, said sheet having a plurality of irregularly disposed but generally parallel ridges on its surface extending substantially diagonally with respect to such areas or figures, and said ridges being formed by a number of adjacent protuberances.

WALLACE W. DE LANEY.